May 6, 1958

J. O. SILVEY ET AL 2,833,926

TRACKING ADJUSTMENT FOR VARIABLY CAPACITIVELY
END-LOADED LONG-LINE ULTRA-HIGH
FREQUENCY TUNER

Filed Jan. 22, 1953

INVENTORS
J. SILVEY
A. WRIGHT
BY
Philip M. Bolton
ATTORNEY

United States Patent Office 2,833,926
Patented May 6, 1958

2,833,926

TRACKING ADJUSTMENT FOR VARIABLY CAPACITIVELY END-LOADED LONG-LINE ULTRA HIGH FREQUENCY TUNER

John O. Silvey and Antony Wright, Fort Wayne, Ind., assignors to International Telephone and Telegraph Corporation, a corporation of Maryland Application January 22, 1953, Serial No. 332,584

11 Claims. (Cl. 250—40)

The present invention relates to tracking adjustment arrangements for U. H. F. circuits, particularly circuits of the coaxial line type which are capacitively tuned by plungers.

In U. H. F. tuners in which a number of coaxial lines are simultaneously tuned by mechanically-coupled capacitive plungers, provision must be made for tracking adjustments for compensating for differences in the lines, plungers, or associated circuits, as well as for tracking with the tuning dial. A typical example of such a tuner is a superheterodyne arrangement in which one line serves as the radio frequency resonator, a second line serves as the mixer resonator, and a third line serves as the resonator for local oscillations. Such a circuit is described in the copending application of J. Silvey, U. S. Serial No. 303,457, filed August 9, 1952, for "Combination V. H. F.–U. H. F. tuner."

For tuning a plunger type capacitively tuned line, the plunger is moved longitudinally between the conductors to vary the area of the plunger surface forming the capacity with one of the conductors, the plunger being coupled to the other conductor preferably by galvanic contact with the other of said conductors. For tracking adjustment of this type of line, some additional independently adjustable means is desirable and one such means is described in J. Silvey-O. Booker, Serial No. 303,456, filed August 9, 1952, for "Variable Line," as being a variable inductance.

An object of the present invention is to provide an additional independently adjustable capacitive tuning means for adjusting a plunger type capacitively tuned line, and particularly one in which the capacitive adjustment is made by rotating the plunger relative to the line.

In accordance with a feature of the present invention, the capacitive tuning plunger is provided with a discontinuity, such as an aperture, extending longitudinally with respect to the line along the surface of the plunger which forms the capacity with one of the conductors of the line. A complementary longitudinally-extending discontinuity, which may also be an aperture, is formed along the opposed face of said conductor. By rotating the plunger with respect to said conductor, the capacity between said plunger and conductor may be varied and adjusted. It is to be noted that with the apertures in a given juxtaposition the change of capacitance relative to the amount of insertion of the plunger in the line follows a given curve. When the juxtaposition of the apertures is varied, not only is the instantaneous value of the capacitance changed, but the steepness of the curve or the rate of change of capacitance is also varied. By means which will be described hereinafter which adjust the initial capacitance, and by the adjustment of the juxtaposition of the apertures to vary said rate, adequate tracking can be provided.

The foregoing and other features and objects of this invention and the manner of attaining them will become more apparent and the invention itself will be best understood, by reference to the following description of an embodiment of the invention taken in conjunction with the accompanying drawings, wherein.

Figure 1:
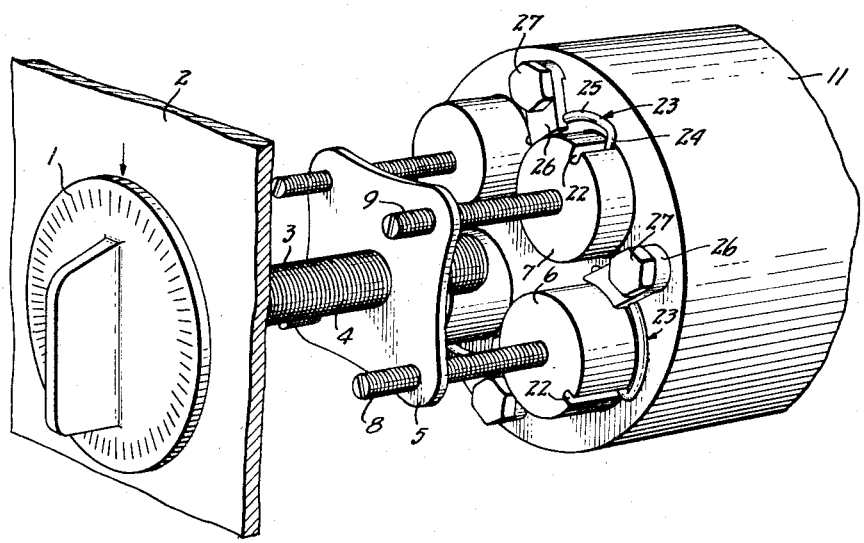
Fig. 1 is a fragmentary view of an ultra high frequency tuner, an indicating dial and the panel on which said dial is mounted.
Figure 2:
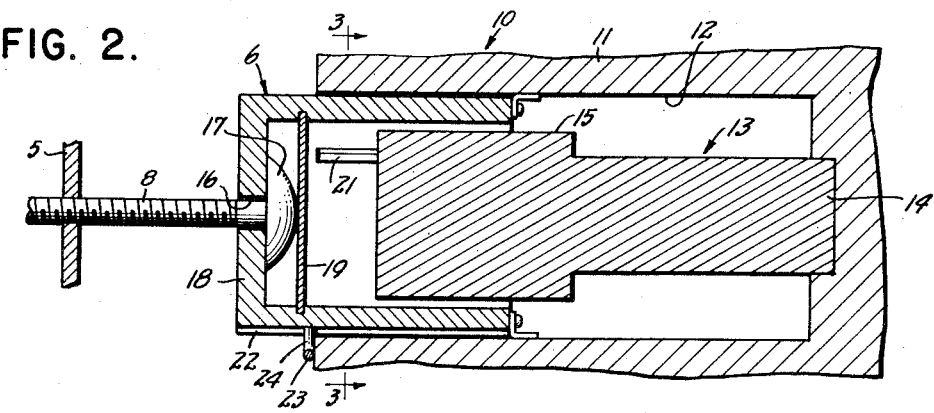
Fig. 2 is a schematic cross sectional view of one of the coaxial tuning circuits of Fig. 1.

Referring now to the drawings and particularly to Fig. 1, a tuning indicating dial 1, mounted on a panel 2, rotates a shaft 3, which is threaded, as indicated at 4, to rectilinearly drive a driving plate 5 to which a plurality of capacitive tuning plungers 6, 7 etc. are mechanically coupled by screws 8 and 9, etc. respectively. Each of the plungers 6, 7 etc. tunes a corresponding quarter wave shorted line as is for example generally indicated by the numeral 10 in Fig. 2. All the lines are arranged in a cylindrical metal housing 11, the outer conductor 12 of each of the lines being formed by an opening in said housing 11. The inner conductor 13 of each line is connected at one end 14 to the wall of the opening to provide a shorted line. Towards the other end the inner conductor may be made with an expanded portion 15 which forms a capacity with a plunger 6, the variation of which capacity tunes the line as the plunger is moved longitudinally in or out of the line. The outer surface of the plunger is galvanically connected to the outer conductor surface 12. To adjust the initial capacitance independently of movement of the driving plate 5 and therefore independently of movement of the other lines and dials, the screw 8 is rotated in the complementary thread in the driving plate to thereby independently move the plunger a given distance in or out. For this purpose an opening 16 is provided at the outer end of the plunger, the screw 8 passing therethrough and the head 17 thereof being maintained between the outer wall 18 of the plunger and a retaining disc 19 so that when the screw was turned the screw head freely turns therein without rotating the plunger, while at the same time advancing or retracting the plunger in a longitudinal direction. This adjustment is used in tracking for initially setting the capacitance of the plunger, preferably at the high frequency end of the tuning band.

Figure 3:
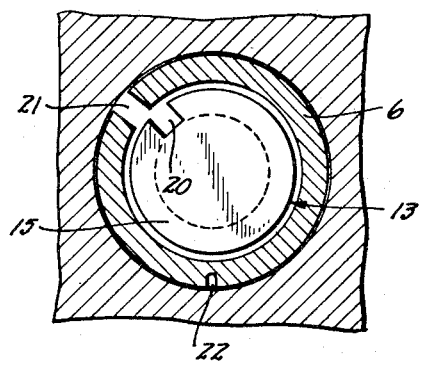
Fig. 3 is a view of a coaxial line circuit taken substantially along the line 3—3 of Fig. 2.

To provide for adjusting the rate of change of capacitance with respect to the degree of insertion of the plunger a pair of longitudinal apertures 20 and 21, as best seen in Fig. 3, are provided. Aperture 20 consists of a longitudinal groove formed in the surface of the expanded portion 15 of the inner conductor while aperture 20 consists of a longitudinal slot formed along a corresponding given amount of the length of the plunger. It will be seen that the capacity between the inner conductor and the plunger is dependent on the surface area and air gap therebetween. By having a gap cut in the plunger and a groove cut in the line as shown in Fig. 3 the effective surface between the inner conductor and plunger is changed merely by rotating the plunger with respect to the line. When the two apertures 20 and 21 line up together there is maximum capacity and when the gaps are separated there is minimum capacity. Thus the juxtaposition of these apertures determines the effective surface and it can be shown that the curve indicating rate of change with respect to plunger insertion becomes steeper and less steep depending upon said juxtaposition.

For rotating the plunger about its longitudinal axis and for then holding it in place so that it will not turn during longitudinal movement of the plunger, various means may be provided one of which is illustrated in the drawings. A groove 22 is provided in the outside circumference of the plunger extending longitudinally along the plunger. A bent wire 23 of spring material, has a straight portion 24 riding in the groove and a curved portion 25 which is adapted to slide under a retaining washer 26 during the time the plunger is revolved. After adjustment, a nut 27 is screwed down to press the washer 2 on the curved portion 25 and prevent the wire and the plunger from rotation while permitting the plunger to move longitudinally with the straight part 24 of the wire riding in groove 22.

Tracking of the lines described herein may be made in the following manner. The plungers are initially adjusted at the high frequency end of the band by rotation of the screws 8, 9 etc. The plungers are then rotated with respect to the lines at the low end of the band to track the lines to each other and the dial. These steps may be repeated a few times as rotation of the plungers at the low end of the band will affect the high end setting.

In an ultra-high frequency television tuner of the superheterodyne type, such as is described in the aforesaid application of J. Silvey, U. S. Serial No. 303,457, filed August 9, 1952, it was found that with plungers of .320" inner diameter and the expanded portion of the lines of .300" diameter and ¾" length, and apertures of ⁵⁄₃₂" width in each, the groove in the line being ¹⁄₁₆" deep, 40 mc. range of adjustment is possible with only ¾" of the plunger over the line at 500 mc. when the plunger is rotated. This is sufficient to take care of the mechanical tolerances of the lines and plungers, and variations in the oscillator frequency, for proper tracking.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. An ultra high frequency tuner comprising a coaxial line having an inner and outer conductor, a capacitive tuning plunger mounted for longitudinal movement into said line between said conductors, said plunger forming a capacitance with one conductor, and being coupled to the other of said conductors, which capacitance varies in accordance with the amount of insertion of said plunger between said conductors, characterized by means for adjusting the rate of change of capacitance with respect to amount of insertion of the plunger into the line, consisting of a generally longitudinally-extending irregularity along the generally cylindrical surface of said plunger facing said one conductor, a generally longitudinally extending irregularity along the opposing generally cylindrical surface of said one conductor, means for mounting said plunger for relative rotation with respect to said one conductor, about the longitudinal axis, to vary the juxtaposition of said irregularities with respect to each other and thereby adjust the capacitance, and means for locking said plunger against rotation while permitting longitudinal movement thereof.

2. An ultra high frequency tuner comprising a coaxial line having an inner and outer generally cylindrical conductor, one of said conductors having a circumferential asymmetry extending longitudially therealong, means for tuning said line comprising a capacitive tuning plunger mounted for longitudinal movement into said line between said conductors, said plunger forming a capacitance with said one conductor and being coupled to the other of said conductors, said plunger having a circumferential asymmetry extending longitudinally therealong complementary to the asymmetry of said one conductor so that upon rotation of the plunger about its longitudinal axis the aforementioned capacitance is varied, means for mounting said plunger for rotative adjustment, and means for locking said plunger against rotation while permitting longitudinal movement thereof.

3. An ultra high frequency tuner according to claim 2 wherein the asymmetry of said one conductor comprises a longitudinal aperture along said conductor and the complementary asymmetry of the plunger comprises a longitudinally extending aperture therein.

4. An ultra high frequency tuner according to claim 2 wherein said asymmetry is in the form of a groove which extends a short distance along said one conductor substantially less than the length thereof.

5. An ultra high frequency tuner according to claim 2 wherein said one conductor is the inner conductor and said asymmetry consists of a longitudinally extending aperture therein, the corresponding circumference of the plunger consisting of the inner circumference thereof whose asymmetry consists of a longitudinally extending aperture therein.

6. A tracking adjustment arrangement for tracking the tuning of a generally cylindrical coaxial resonant line with the mechanical movements of another device, in which the line is tuned by a capacitance generally cylindrical plunger insertable by longitudinal movement between the inner and outer conductors of said line, the means for moving said plunger being mechanically coupled to said device, comprising a circumferential discontinuity in the surface of said plunger, extending longitudinally therealong, which plunger forms a capacitance with one of said conductors, and a complementary discontinuity in the circumference of said one conductor extending longitudinally therealong, and means for mounting said plunger for relative rotation about its longitudinal axis with respect to said one conductor to vary the degree of juxtaposition of said discontinuities.

7. An ultra high frequency tuner according to claim 6 further including additional means for adjusting the amount of insertion of the plunger between the conductors independent of the movement of said other device.

8. An ultra high frequency tuner according to claim 7 wherein the means for moving said plunger comprises a mechanical link and said additional means for adjusting the amount of insertion of said plunger comprises additional adjustable spacing means between said link and said plunger to vary the degree of insertion of said plunger independently of movement of the mechanical link.

9. An ultra high frequency tuner according to claim 6 wherein said device is another resonant coaxial line.

10. An ultra high frequency tuner according to claim 6 wherein said device is a dial.

11. An ultra high frequency tuner according to claim 6 further including means for locking said plunger against rotation while permitting longitudinal movement thereof.

References Cited in the file of this patent

UNITED STATES PATENTS

| | | |
|---|---|---|
| Re. 23,605 | Wallin | Dec. 23, 1952 |
| 2,252,092 | Newman | Aug. 12, 1941 |
| 2,465,102 | Joy | Mar. 22, 1949 |
| 2,497,662 | Dressel | Feb. 14, 1950 |
| 2,543,246 | Landon et al. | Feb. 27, 1951 |
| 2,543,891 | Carlson et al. | Mar. 6, 1951 |
| 2,561,398 | Miller | July 24, 1951 |
| 2,575,199 | Stutt | Nov. 13, 1951 |
| 2,578,429 | Karplus | Dec. 11, 1951 |
| 2,583,027 | Taylor | Jan. 22, 1952 |